May 29, 1951     G. W. WRIGHT ET AL     2,554,514
UNIVERSAL CONNECTION UNIT
Filed March 25, 1948
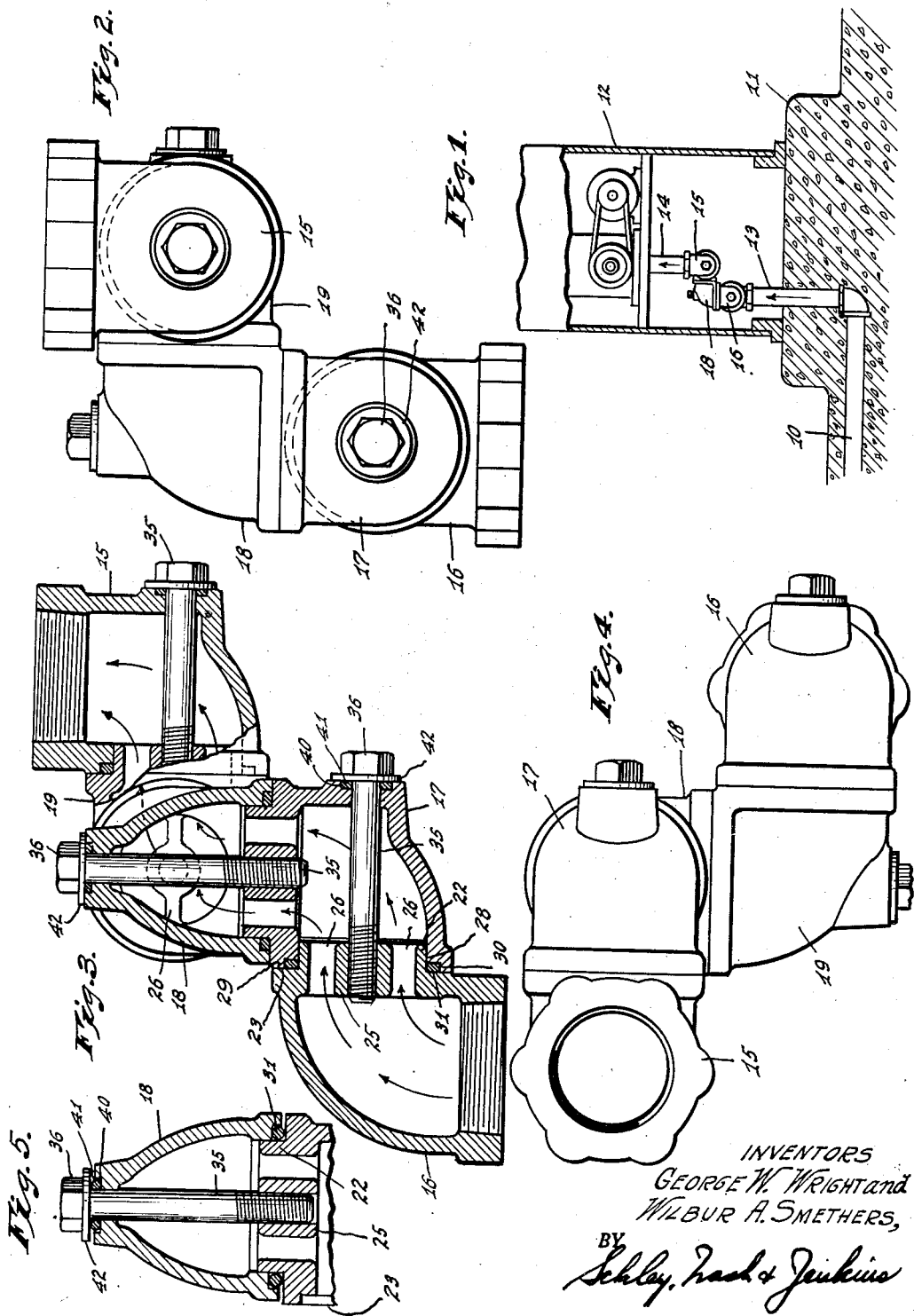
INVENTORS
GEORGE W. WRIGHT and
WILBUR A. SMETHERS,
BY
Schley, Nash & Jenkins
ATTORNEYS.

Patented May 29, 1951

2,554,514

UNITED STATES PATENT OFFICE 2,554,514

UNIVERSAL CONNECTION UNIT

George W. Wright and Wilbur A. Smethers, Fort Wayne, Ind., assignors to Tokheim Oil Tank & Pump Company, Fort Wayne, Ind., a corporation of Indiana Application March 25, 1948, Serial No. 17,058

9 Claims. (Cl. 285—96.7)

This invention relates to a universal connection especially adapted for connecting a gasoline dispensing pump to the outlet pipe from an underground storage tank.

In the common service-station installation of a gasoline dispensing pump, the supply pipe from the underground storage tank is brought up through a concrete island, and its outlet end is left projecting upward from that island in a position within the base area of the pump which is to be installed. The pump unit installed on the island is provided with a depending inlet pipe which is to be connected to the supply pipe from the storage tank. When the pump is properly positioned on the island, the two pipes which are to be connected are rarely in alignment, and there is no uniformity either with respect to their misalignment or with respect to the length of gap between them. The connection between such pipes must be made with great care, both because the gasoline which they are to carry has a strong tendency to leak, and because the gasoline is carried through the connection under a suction lift. Moreover the working space is extremely limited, and usually it is wholly impractical to make accurate measurements of the gap and misalignment between the pipes to be joined. In the usual practice, the two pipes are connected with ordinary pipe fittings and a separable union, which necessitate a cut and try procedure to properly assemble the pipe fittings, then a disassembly of the fittings, and then then their reassembly with suitable gasoline resisting pipe joint sealing compound. In such usual practice, especially in view of the large and variable tolerances encountered in such pipe-fittings, it is extremely difficult to make a proper connection without leaving the elements under such strain that later failure occurs.

It is the object of our invention to provide a universal connection unit which will effectively join the intake pipe of a gasoline dispensing pump to its supply pipe, which universal connection will in general greatly facilitate the making of this connection. It is our object to provide a connection device which will provide ample universal adjustment to meet all the various conditions encountered in such installations; which can be installed with its parts substantially tight yet movable with respect to each other to meet the conditions encountered and which can then be finally tightened to permanent position without residual strain either between the parts of the connection or upon the pipes to be connected; and which when so tightened still retains a capacity for universal movement under an extreme strain which might be imposed by accident, as by collision of an automobile with the pump unit.

In accordance with our invention we provide a universal connection unit comprising a series of a plurality of short elbows, with end members adapted to be joined to the intake and supply pipes, and with the several members interconnected by swivel joints which come together axially, and which are held together and may be locked in substantially fixed position by a coaxial bolt passing through the rear wall of one of the adjoining members and threaded into a boss of the other. Desirably, all of the intermediate elbows are of identical construction, with complementary swivel-joint halves at their opposite ends. With the swivel joints of this type, the number of intermediate elbows in the series may be varied in accordance with the conditions encountered, and the supply and inlet pipes of the installation may be joined with a minimum number of parts and with no necessity for cutting and trying various pipe fittings.

Our invention is illustrated in the accompanying drawing. In the drawing, Fig. 1 is a vertical section through a gasoline dispensing pump installation of the type in which our connection unit is adapted to be used; Fig. 2 is a side elevation of a connection unit embodying our invention; Fig. 3 is a front elevation, with parts shown in section, of the unit shown in Fig. 2; Fig. 4 is a plan view of the connection unit shown in Figs. 2 and 3; and Fig. 5 is a fragmental section showing the details of the swivel joint, with the parts in loosely assembled position.

Our universal connection unit is intended for use in an installation of the type indicated in Fig. 1. The gasoline supply pipe 10 leads from an underground storage tank through a concrete base 11 for the gasoline dispensing pump 12, and terminates in a stub pipe 13 projecting upwardly from the base 11 within the base-area of the pump unit 12. A pump intake pipe 14 leading to the gasoline dispensing mechanism is connected to the supply pipe 13 by our universal connection unit.

The universal connection unit shown in the drawing comprises a pair of end members 15 and 16, and a plurality of intermediate elements, shown as three intermediate elements 17, 18, and 19, joined in series between the end members 15 and 16. The outer ends of the end members 15 and 16 are threaded to be received on the pipes 13 and 14, and each pair of adjoining elements of the connection unit are interconnected by a swivel joint which is assembled by axial movement and is held together by a co-axial bolt. One-half of the swivel joint, which we shall call the threaded half, comprises a cylindrical collar 22 adapted to be received in a bore of the complementary joint-half, with a radial annular face 23 adjacent the outer surface of the collar 22. Within the opening within the collar 22 there is a central boss 25, conveniently supported by a pair of radial legs 26 from the collar 22, and such boss is bored and threaded co-axially with the collar 22.

The complementary swivel-joint half, which we shall call the bolt-half, is formed to provide a cylindrical bore surface 28 of a size to slidably receive the collar 22, and about such bore a radial annular face 29 is formed to mate with the face 23 of the threaded joint-half. A gasket groove 30 is formed in one of the parts, to lie adjacent the outer surface of the collar 22, and conveniently such groove is formed by counterboring the bolt-half of the joint. The groove 30 is desirably rectangular in cross section, with somewhat greater width than depth, and the gasket 31 received in such groove is a ring of circular cross section, with a cross-sectional diameter greater than the depth of the groove 30 and with a cross-sectional area less than the cross-sectional area of the groove 30. When the parts are in loosely assembled position, as shown in Fig. 5, the gasket 31 lies in the groove 30 with its circular cross section undeformed, and desirably with a snug fit about the collar 22.

The joint halves are held together by a stud bolt 35 which passes through an opening coaxial with the bore surface 28 through the rear wall of the member upon which such bore surface 28 is formed. To seal this opening, the metal surrounding it is faced and counter-bored to form a gasket groove 40 of rectangular cross section, which receives a ring gasket 41 of circular cross section, and a washer 42 lies against the gasket 41 beneath the head 36 of the bolt 35. The gaskets 31 and 41 are of resilient gasoline-resistant material, such as synthetic rubber.

With parts in the relationship indicated, when the bolt 35 is tightened, the faces 23 and 29 are brought toward each other, and the washer 42 is pressed toward the underlying face, and the gaskets 31 and 41 are deformed, to make resilient sealing engagement with their confining walls and hence to seal the openings which they encircle. During installation of the universal connection unit, the bolt 35 may be tightened to bring the faces 23 and 29 and the washer 42 and its underlying face into no more than a light engagement, so that the adjoining halves of the swivel joint may be relatively swiveled to bring the various parts of the connection unit to the proper position. The bolt 35 may then be tightened further to press the faces 23 and 29 into substantially firm metal-to-metal contact.

Each successive joint in the series of elements making up the universal connection unit is desirably arranged with its respective halves in the same order, so that each intermediate element 17, 18, and 19 is the same, with a bolt-half of the swivel joint at one of its openings and the complementary threaded-half of the swivel joint at the other of its openings. The intermediate elements may then be joined in series, with as many such elements in the series as may be desired or convenient. The two end members, which are each threaded at one opening to be received on a pipe 13 or 14, are respectively shaped at their other openings to form complementary swivel-joint halves. The two end members 15 and 16 may then be joined at opposite ends of the series of intermediate members, and their swivel joint halves will mate with the complementary joint halves at the ends of the series of intermediate members.

With three intermediate members 17, 18, and 19 as shown in the drawing, there is a swivel joint between the intermediate elements 17 and 18 about which the parts may be moved to vary the offset between the threaded openings of the end members 15 and 16. There is a swivel joint between the intermediate members 18 and 19 about which the parts may be moved for further adjustment, as to take account of any lack of parallelism between the pipes 13 and 14. There are also swivel joints between the end members 15 and 16 and the series of intermediate members, about which the parts may be moved for further adjustment, as to take account of variations in spacing between the ends of the pipes 13 and 14.

Installation of the universal connection unit is convenient and simple, and it can readily be made within the space limitations imposed by the frame and walls of the gasoline dispensing unit 12. Any of the swivel joints may be disassembled or assembled without relative rotation of the adjoining elements, merely by loosening and removing the associated bolt 35. For installation, the two end members 15 and 16 are threaded onto the pipes 13 and 14, with suitable gasoline-resistant joint compound in the threads, and a series of intermediate members are then connected between them in a suitable number and in a suitable position of adjustment to joint them. Such assembly is facilitated and parts guided to proper relative position by engagement of the collars 22 with the bores 28 of the adjoining members. Relative movement at any of the swivel joints may readily be made as desired during the course of such installation, yet with the parts assembled to permit this ready movement, the parts will be held frictionally by the gasket rings 31 in any position of adjustment to which they may be brought.

As a final step in the installation, the several bolts 35 are desirably tightened to bring the mating faces into metal-to-metal contact, but such tightening is not essential, for the resilient gaskets will completely seal the joints well before their parts reach this final position. The final tightening, while it may be to reasonable firmness, may desirably avoid too great rigidity between the parts, to leave a possibility of movement at the swivel joints in the event of any abnormal strain such as might be imposed by collision of an automobile with the gasoline dispensing unit.

We claim as our invention:

1. A universal connection unit adapted to join the supply and intake pipes of a gasoline dispensing pump, comprising a pair of end members adapted to be joined to said pipes, and a series of a plurality of intermediate members in the form of short 90° elbows joined end to end and to said end members by rotatably adjustable joints, each adjoining pair of members having complementary joint halves formed about their adjoining end openings and engageable by movement axially of the joint, the planes of adjustment of the joints at the opposite ends of each elbow being disposed to cross at substantially a right angle in a line lying wholly outside said elbow, a boss supported centrally in the opening of one adjoining member of each pair, a connecting bolt extending from said boss axially of the joint through the wall behind the opening of the adjoining member, and outside means to tighten said connecting bolt.

2. A universal connection unit as defined in claim 1, wherein each joint comprises a pilot collar on one member slidably engaging a bore of its adjoining member, one of said members being provided with a groove adjacent the wall of said collar, and a gasoline resistant gasket in such groove and adapted to make sealing engagement with the two halves of said joint when said parts are tightened.

3. A universal connection unit as defined in claim 1, wherein each joint comprises a pilot collar on one member slidably engaging a bore of its adjoining member, one of said members being provided with a groove adjacent the wall of said collar, and adjacent faces on the respective members which make metal-to-metal contact when the joint is tightened, and a resilient deformable gasket of rubber-like material in said groove having a cross sectional area less than that of said groove and adapted to make sealing engagement with its retaining walls and to be deformed into its groove when said parts are tightened to such metal-to-metal contact.

4. A universal connection unit as defined in claim 1 wherein one half of each joint comprises a collar adapted to be received in a bore of its adjoining member, and a radial face surrounding said collar, the complementary half of each joint comprising a bore adapted to receive said collar, and a radial face surrounding said bore and mating with the radial face of the first joint half, a groove in one of said faces adjacent the wall of said collar, a resilient deformable gasket in said groove and adapted to make resilient sealing engagement with its confining walls when the parts are drawn together, a boss supported centrally within the opening of one of the joint halves and adapted to support a connecting bolt coaxial therewith, and a bolt extending coaxially of the opening of the other joint half into engagement with said boss and adapted to hold the complementary halves of said joint together.

5. A universal connection unit as defined in claim 1 in which each of the intermediate members is formed to provide complementary joint halves about its respective openings, a boss supported centrally of one of said openings and bored and threaded co-axially therewith, a bolt adapted to fit the threaded opening of such boss and passing through a wall of said member co-axial with the other opening thereof, one of the end members of the connection unit being provided with a threaded boss and a joint half corresponding to that surrounding the first-mentioned opening of the intermediate member, and the other end member of said universal connection unit being provided with a bolt and a joint half corresponding to that surrounding the other opening of the intermediate member.

6. A universal connection unit adapted to join the supply and intake pipes of a gasoline dispensing pump, comprising a pair of end members adapted to be joined to said pipes, and a series of a plurality of intermediate members in the form of short elbows, said members providing a continuous passage through said connection unit, rotatably adjustable joints between adjoining members of said universal connection unit, securing means for said joints comprising a boss positioned within the opening of one of the adjoining members and bored and threaded co-axially therewith, and a bolt extending through the wall of the adjoining member and threaded into said boss, and a gasket adapted to be pressed into sealing engagement with the two halves of the swivel joint when said bolt is tightened.

7. In a universal connection unit adapted to make a fluid-tight connection between two adjacent opposed pipe-ends, an intermediate member comprising walls forming a short-bend passage, complementary rotatably-adjustable-joint halves formed about the respective end openings of said passage in planes at an angle to each other, a connecting bolt, a boss supported centrally of one of said openings and adapted to support the connecting bolt co-axial therewith, the wall behind the other opening being provided with a hole to pass the connecting bolt co-axial with such other opening, a plurality of such intermediate members being adapted to be joined in series.

8. A universal connection unit adapted to make a fluid-tight connection between two adacent opposed pipe-ends, comprising a pair of end-members adapted to be joined to said pipes, and a series of a plurality of intermediate members in the form of individual short elbows arranged end-to-end between said end members and joined by rotatably adjustable joints which position the adjoining parts in metal-to-metal contact, said joints being assembled by movement axially thereof and held together by a connecting bolt extending between a central support in the end of one adjoining member and the opposite rear wall of the other member, a gasket groove about each joint and a gasket therein adapted to make sealing contact with the adjoining members and to be deformed into its groove when the adjoining parts are brought to metal-to-metal contact.

9. A universal connection member, a plurality of which are adapted to be joined in series to form a universally adjustable connection between end members joined to a pair of pipe ends, said member being in the form of a hollow short elbow which curves through not more than 90° of arc, the opposite ends thereof being formed respectively as complementary halves of a rotatably adjustable joint, the planes of rotatable adjustment of said two joint-halves crossing at substantially a right angle in a line lying wholly outside said elbow and each joint-half being located in its plane wholly at one side of the plane of adjustment of the other, the outer wall behind one joint-half being provided with an opening to pass a connecting bolt co-axial with said joint-half, the other joint-half being provided with a central bolt supported about an axis normal to the axis of said bolt-passing opening, said bolt support being spaced toward said other joint-half from the axis of said bolt-passing opening whereby a bolt through said opening will clear a bolt supported in said bolt support.

GEORGE W. WRIGHT.
WILBUR A. SMETHERS.

REFERENCES CITED

The following references are of record in the file of this patent:

UNITED STATES PATENTS

| Number | Name | Date |
|---|---|---|
| 525,884 | Campbell | Sept. 11, 1894 |
| 694,321 | Moran | Feb. 25, 1902 |
| 1,135,139 | Rankin | Apr. 13, 1915 |
| 1,920,610 | Timbs | Aug. 1, 1933 |